United States Patent
Wang et al.

(10) Patent No.: US 11,521,327 B2
(45) Date of Patent: Dec. 6, 2022

(54) DETECTION TARGET POSITIONING DEVICE, DETECTION TARGET POSITIONING METHOD, AND SIGHT TRACKING DEVICE

(71) Applicant: BOE Technology Group Co., Ltd., Beijing (CN)

(72) Inventors: Fuyin Wang, Beijing (CN); Ruoyu Huang, Beijing (CN); Min Peng, Beijing (CN); Yue Li, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 164 days.

(21) Appl. No.: 16/182,950

(22) Filed: Nov. 7, 2018

(65) Prior Publication Data
US 2019/0147605 A1    May 16, 2019

(30) Foreign Application Priority Data
Nov. 10, 2017  (CN) .......................... 201711106027.9

(51) Int. Cl.
*G06V 40/18*     (2022.01)
*G06T 7/269*     (2017.01)
(Continued)

(52) U.S. Cl.
CPC ................ *G06T 7/269* (2017.01); *G06T 7/11* (2017.01); *G06T 7/70* (2017.01); *G06V 40/193* (2022.01);
(Continued)

(58) Field of Classification Search
CPC ... G06T 2207/10024; G06T 7/11; G06T 5/20; G06T 5/30; G06T 2207/20132;
(Continued)

(56) References Cited

U.S. PATENT DOCUMENTS 8,634,673 B1 *  1/2014  McDougal ................ G06T 5/00
                                                        382/274
9,087,261 B1 *  7/2015  McDougal ............. G06V 10/20
(Continued)

FOREIGN PATENT DOCUMENTS

CN    108389188 A  *  8/2018  ............. G06T 5/002
JP    2006333205 A  *  12/2006  ......... G06F 16/5838

OTHER PUBLICATIONS

Hao et al., Image super-resolution via sparse coding for Chinese license plate recognition, Oct. 14-16, 2015 [retrieved Jun. 14, 2020], 2015 8th International Congress on Image and Signal Processing, pp. 944-948. Retrieved: https://ieeexplore.ieee.org/abstract/document/7408014 (Year: 2015).*

(Continued)

*Primary Examiner* — Matthew C Bella
*Assistant Examiner* — Dennis Rosario
(74) *Attorney, Agent, or Firm* — Nath, Goldberg & Meyer; Joshua B. Goldberg

(57) ABSTRACT

Disclosed is a detection target positioning method and device. The method comprises: acquiring an original image and pre-processing the original image to obtain a gradation of each pixel in a target gradation image corresponding to a target region including a detection target; calculating first gradation sets corresponding to rows of pixels of the target gradation image and second gradation sets corresponding to columns of pixels of the target gradation image; and determining rows of two ends of the detection target in a column direction according to the first gradation sets, determining columns of two ends of the detection target in a row direction according to the second gradation sets, and determining a center of the detection target according to the row of two ends of the detection target in the column direction (Continued)

and the columns of two ends of the detection target in the row direction.

19 Claims, 6 Drawing Sheets

(51) Int. Cl.
*G06T 7/11* (2017.01)
*G06T 7/70* (2017.01)

(52) U.S. Cl.
CPC .............. *G06T 2207/10024* (2013.01); *G06T 2207/20024* (2013.01); *G06T 2207/20036* (2013.01); *G06T 2207/20132* (2013.01); *G06T 2207/30041* (2013.01)

(58) Field of Classification Search
CPC ....... G06T 2200/28; G06T 2207/30201; G06T 2207/30216; G06T 1/00; G06T 7/269; G06T 11/001; G06T 7/168; G06T 5/007; G06T 5/008; G06T 5/00; G06T 5/002; G06T 2207/30041; G06K 9/00228; G06K 9/342; G06K 9/0061; G06K 9/36; G06K 9/54; G06K 9/00288; G06K 15/1878; H04N 5/23219; H04N 5/23218; H04N 1/40062; H04N 1/6016; H04N 1/54; H04N 1/6027; H04N 1/60; H04N 19/117; G09G 2340/0428; G09G 2340/06; G09G 2320/0271; G06V 10/56; G06V 40/193; G06V 20/695; G06F 3/013; A61B 3/12; A61B 3/113; A61B 3/14
See application file for complete search history.

(56) References Cited

U.S. PATENT DOCUMENTS

| | | | | |
|---|---|---|---|---|
| 9,892,499 | B2* | 2/2018 | Yu | G06V 10/7715 |
| 10,398,301 | B2* | 9/2019 | Jahnke | A61B 3/0091 |
| 2006/0210124 | A1* | 9/2006 | Ishii | G06K 9/00281 |
| | | | | 382/118 |
| 2012/0044335 | A1* | 2/2012 | Goto | G06T 11/00 |
| | | | | 348/77 |
| 2014/0078282 | A1* | 3/2014 | Aoki | G06K 9/00221 |
| | | | | 348/78 |

OTHER PUBLICATIONS

Machine translation via SEARCH of JP 2006-333205 A to Daisuke et al., 34 pages. (Year: 2022).*
Machine translation (examiner annotated) of CN-108389188-A to Cheng B via Search, A Sparse Hyperspectral Abnormal Target Detecting Method, retrieved via Search Jul. 26, 2022, 23 pages. (Year: 2022).*
Burger et al., Filters, Mar. 26, 2016 [retrieved Jul. 25, 2022],Texts in Computer Science: Digital Image Processing: An Algorithmic Introduction Using Java, Second Edition, pp. 89-119. Retrieved: https://link.springer.com/chapter/10.1007/978-1-4471-6684-9_5 (Year: 2016).*

* cited by examiner

DETECTION TARGET POSITIONING DEVICE, DETECTION TARGET POSITIONING METHOD, AND SIGHT TRACKING DEVICE

CROSS-REFERENCE TO RELATED APPLICATIONS

The present application claims priority to Chinese Patent Application No. 201711106027.9, entitled "Pupil Positioning Device, Pupil Positioning Method, and Sight Tracking Device" filed in the Chinese Intellectual Property Office on Nov. 10, 2017, the disclosure of which is incorporated herein by way of reference.

FIELD OF THE INVENTION

The present disclosure relates to, but is not limited to, the field of image processing, and in particular to a detection target positioning device, a detection target positioning method, and a sight tracking device.

BACKGROUND

Sight tracking technology is an important technology in the field of virtual reality. The purpose of sight tracking is to obtain the current sight direction of the user. The sight tracking technology can collect the child's attention point information, assist the sputum patient to perform human-computer interaction, and detect sight fatigue driving, for example.

Detection target positioning is an important step in the sight tracking process. The detection target positioning methods in the related art employ relatively complicated calculation manners (for example, ellipse fitting) to determine the center of detection target, resulting in a slower positioning speed.

SUMMARY

Embodiments of the disclosure provide a detection target positioning device, a detection target positioning method, and a sight tracking device.

According to the first aspect, an embodiment of the disclosure provides a detection target positioning device comprising: a pre-processor, configured to acquire an original image and pre-process the original image to obtain a gradation of each pixel in a target gradation image corresponding to a target region including a detection target; an accumulator, configured to calculate a plurality of first gradation sets corresponding to rows of pixels of the target gradation image and a plurality of second gradation sets corresponding to columns of pixels of the target gradation image, wherein the first gradation set is a sum of gradations of pixels in a corresponding row, and the second gradation set is a sum of gradations of pixels in corresponding column; and a centering component, configured to determine row of two ends of the detection target in a column direction according to the plurality of first gradation sets, determine columns of two ends of the detection target in a row direction according to the plurality of second gradation sets, and determine a center of the detection target according to the row of two ends of the detection target in the column direction and the columns of two ends of the detection target in the row direction.

Accordingly, according to the second aspect, an embodiment of the disclosure provides a detection target positioning method, comprising steps of: S1, acquiring an original image and pre-processing the original image to obtain a gradation of each pixel in a target gradation image corresponding to a target region including a detection target; S2, calculating a plurality of first gradation sets corresponding to rows of pixels of the target gradation image and a plurality of second gradation sets corresponding to columns of pixels of the target gradation image, wherein the first gradation set is a sum of gradations of pixels in a corresponding row, and the second gradation set is a sum of gradations of pixels in corresponding column; and S3, determining rows of two ends of the detection target in a column direction according to the plurality of first gradation sets, determining columns of two ends of the detection target in a row direction according to the plurality of second gradation sets, and determining a center of the detection target according to the row of two ends of the detection target in the column direction and the columns of two ends of the detection target in the row direction.

Accordingly, according to the third aspect, an embodiment of the disclosure provides a sight tracking device, comprising the detection target positioning device as set forth above.

Accordingly, according to the fourth aspect, an embodiment of the disclosure provides a computer readable storage medium in which computer executable instructions for executing the method according to the embodiments of the disclosure.

BRIEF DESCRIPTION OF THE DRAWINGS

The accompanying drawings are included to provide a further understanding of the present disclosure and constitute a part of the specification. It is to be understood that the accompanying drawings in conjunction with embodiments below are intended to explain the present disclosure rather than to form the limitation of the disclosure. In the drawing:

FIG. 3b is a schematic diagram illustrating the effect of the target gradation image corresponding to FIG. 3a;

DETAILED DESCRIPTION OF THE EMBODIMENTS

The specific embodiments of the present disclosure will be described in detail below with reference to the accompanying drawings. It is to be understood that the specific embodiments described herein are provided only to explain and illustrate rather than to construct the present disclosure.

It should be understood that the term "detection target" as used herein may be a pupil, a human torso, or the like.

Figure 1:
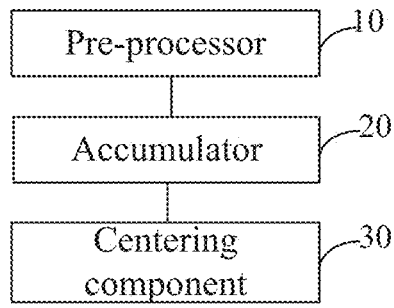
FIG. 1 is a block diagram schematically illustrating a detection target positioning device according to an embodiment of the present disclosure.

As an aspect of the present disclosure, there is provided a detection target positioning device. As shown in FIG. 1, the detection target positioning device includes a pre-processor 10, an accumulator 20, and a centering component 30.

The pre-processor 10 is configured to acquire an original image and pre-process the original image to obtain a gradation of each pixel in a target gradation image corresponding to a target region including a detection target. Herein, the original image may be directly acquired by the pre-processor 10 or may be acquired by an external image acquisition device. The pre-processor 10 can be coupled to an image capture device to acquire the original image. The original image may be an image of an eye area or may be a face image. The present disclosure will be described by using a color image as the original image. At this time, the pre-processing performed by the pre-processor 10 includes at least gradation conversion. The target region may be an area including an eyelid and an eyeball.

The accumulator 20 is coupled to the pre-processor 10, and is configured to calculate a plurality of first gradation sets corresponding to rows of pixels of the target gradation image and a plurality of second gradation sets corresponding to columns of pixels of the target gradation image, wherein the first gradation set is a sum of gradations of pixels in a corresponding row, and the second gradation set is a sum of gradations of pixels in corresponding column.

The centering component 30 is couple to the accumulator 20, and is configured to determine row of two ends of the detection target in a column direction according to the plurality of first gradation sets, determine columns of two ends of the detection target in a row direction according to the plurality of second gradation sets, and determine a center of the detection target according to the row of two ends of the detection target in the column direction and the columns of two ends of the detection target in the row direction. It can be understood that the detection target is circular, and the gradation of the detection target is different from that of the surrounding pixels. Therefore, after the accumulation by the accumulator 20, the first gradation sets corresponding to the detection target region will be distinct from the first gradation sets corresponding to other areas, and the second gradation sets corresponding to the detection target region will be distinct from the second gradation set corresponding to other areas. Therefore, the centering component 30 can determine the columns in which the left and right ends of the detection target are located and the row in which the upper and lower ends are located, based on the position where the difference occurs. Further, if a coordinate system in relation to the target gradation image is established, and column numbers of the pixels in the target gradation image are taken as horizontal ordinates and row numbers thereof are taken as vertical ordinates, then the horizontal ordinate of the center of the detection target is an average value of the column numbers of the left and right ends of the detection target, and the vertical ordinate of the center of the detection target is an average value of the row numbers of the upper and lower ends of the detection target.

In the related art, when the positioning of a center of a detection target, a method of ellipse fitting is generally adopted, wherein a set of sample points is first determined and the set of sample points is fitted with an elliptic equation as a model, such that an elliptic equation satisfies with these data as much as possible to work out the center of the elliptic equation. This requires complex calculations, reducing the efficiency of detection target positioning. In contrary, only simple addition operations are needed when the detection target positioning device of the present disclosure locates the center of the detection target, thereby providing the simpler calculation and the higher positioning efficiency.

The detection target positioning device according to the present disclosure may use an FPGA (Field-Programmable Gate Array) or an ASIC (Application Specific Integrated Circuit) as a carrier, and thus there is no need to rely on calculations of CPU (Central Processing Unit) and GPU (Graphics Processing Unit) in the computer, thereby improving the portability of the detection target positioning device. When the detection target positioning is performed based on the CPU, it is necessary to invoke each functional component in the CPU step by step, resulting in a slow operation speed. In contrast, the detection target positioning device using the FPGA or ASIC as the carrier according to the present disclosure can increase the operation speed, thereby improving the user experience.

The pre-processor 10, the accumulator 20, and the centering component 30 of the detection target positioning device according to the present disclosure will be specifically described hereinafter with reference to FIGS. 1 to 9.

The pre-processor 10 includes an image cropping circuit 11, a gradation conversion circuit 12, a Gaussian filter circuit 13, a binarization circuit 14, and a corrosion circuit 15.

The image cropping circuit 11 is configured to perform image cropping on the original image to obtain color information of each pixel in the color image of the target region. Herein, the original image is a color image with red, green and blue as the base color, and the color information of each pixel includes a luminance of three components of red, green and blue of each pixel.

The gradation conversion circuit 12 is coupled to the image cropping circuit 11 and configured to perform gradation conversion on the color image of the target region to obtain the gradation of each pixel of a first gradation image. It should be understood that the original image can also be a gradation image. At this time, the gradation information of each pixel in the gradation image of the target region can be obtained after cropped by the image cropping circuit 11, and thus the gradation conversion circuit 12 is no longer needed.

The Gaussian filter circuit 13 is coupled to the gradation conversion circuit 12, and is configured to perform Gaussian filtering on the first gradation image to obtain gradation of each pixel of a second gradation image. In the process of the Gaussian filtering, for any one of the pixels, a weighted average of the pixel and other pixels around the pixel is used as the gradation of the pixel after filtering, so that the pixel is subjected to modifying and smoothing to reduce noises in the image.

The binarization circuit 14 is coupled to the Gaussian filter circuit 13 and configured to perform binarization processing on the second gradation image to obtain gradation of each pixel in a third gradation image. Specifically, in the process of the binarization, it is judged whether the gradation of each pixel in the second gradation image is greater than a predetermined threshold, and if so, the gradation of the pixel will be adjusted to 0; if not, the gradation will be adjusted to 255. After the gradation of all the pixels is adjusted, the resulted image is regarded as the third gradation image.

Figure 3A:
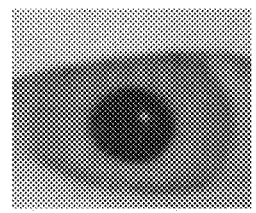
FIG. 3a is an effect diagram illustrating a first gradation image obtained by gradation conversion in an actual application.
Figure 3B:
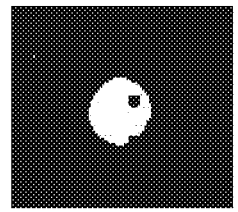

The corrosion circuit 15 is coupled to the binarization circuit 14 and configured to corrode the third gradation image to obtain the gradation of each pixel of the target gradation image. FIG. 3a is a diagram illustrating an effect of a first gradation image obtained by gradation conversion in a practical application; and FIG. 3b is a schematic diagram illustrating an effect of the corresponding target gradation image.

Figure 2:
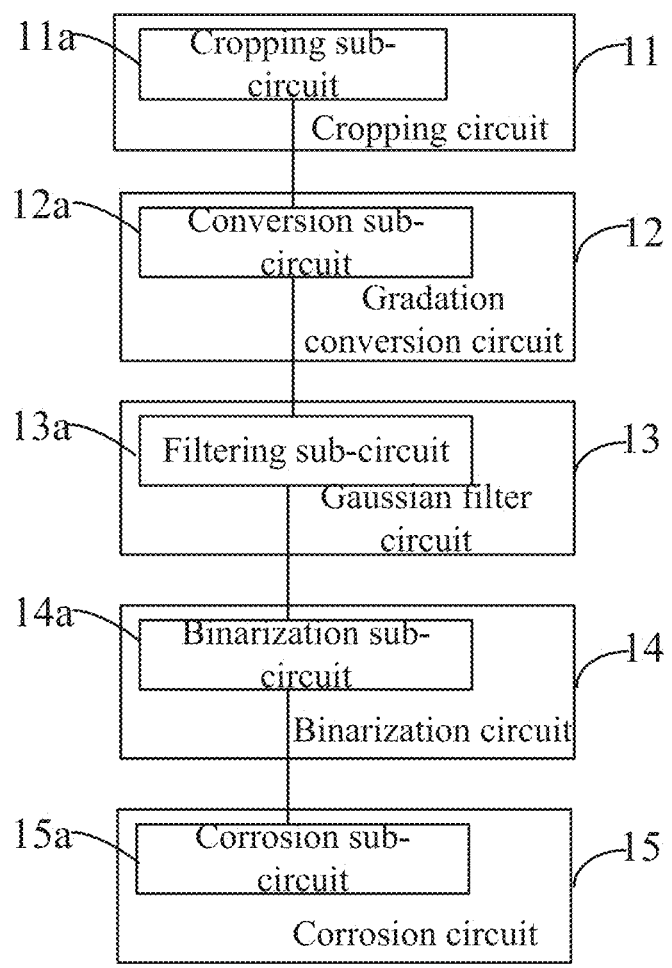
FIG. 2 is a block diagram schematically illustrating a pre-processor according to an embodiment of the present disclosure.

Further, as shown in FIG. 2, the image cropping circuit 11 includes one or more in-parallel cropping sub-circuits 11a, the gradation conversion circuit 12 includes one or more conversion sub-circuits 12a corresponding to the one or more in-parallel cropping sub-circuits 11a, respectively, the Gaussian filter circuit 13 includes one or more filtering sub-circuits 13a corresponding to the one or more conversion sub-circuits 12a, respectively, the binarization circuit 14 includes one or more binarization sub-circuits 14a corresponding to the one or more filtering sub-circuits 13a, respectively, and the corrosion circuit 15 includes one or more corrosion sub-circuits 15a corresponding to the one or more binarization sub-circuits 14a, respectively. As shown in FIG. 2, the present disclosure will be described by way of a cropping sub-circuit 11a, a conversion sub-circuit 12a, a filtering sub-circuit 13a, a binarization sub-circuit 14a, and a corrosion sub-circuit 15a.

The cropping sub-circuit 11a is configured to receive the color information of the pixel in the original image row by row and one by one, and judge whether the pixel is located in the target region for each receipt of the color information of the pixel, and if so, the color information of the pixel will be output to the corresponding conversion sub-circuit 12a; if not, the color information of the pixel will not be output. In the related art, when performing various processing, the image processing apparatus or a processing method based on CPU or GPU starts to processes the pixels one by one after receiving the gradation of all the pixels in the entire image; after that, the gradations of the individual pixels are output one by one, so that a large amount of data needs to be buffered. In contrast, the cropping sub-circuit 11a in the present disclosure starts to process the pixel for each receipt of the gradation of a pixel without waiting to receive all the pixel. Therefore, the detection target positioning device of the embodiment can increase the processing speed and does not need to buffer too much data, thereby reducing resource occupation and reducing the volume and power consumption of the entire device.

Each time the conversion sub-circuit 12a receives the color information of one pixel, it will perform the gradation conversion on the color information and output converted gradation to the corresponding filtering sub-circuit. Specifically, the conversion sub-circuit 12a may perform the gradation conversion using a weighted averaging method, in which the weighted average of the luminance of the three components of red, green and blue of the pixel is used as the converted gradation. Like the cropping sub-circuit 11a, the conversion sub-circuit 12a starts gradation conversion of the pixel and outputs the converted gradation every time the gradation of a pixel is received, so that it is not necessary to buffer much gradation of pixels. Thus, resource occupation and power consumption can be reduced.

Specifically, for the color information of 565 system (i.e., the color information is represented by a 16-bit binary number, wherein the first 5 bits are luminance values of the red component, the middle 6 bits are luminance values of the green component, and the last 5 bits are luminance values of the blue component), the gradation conversion formula is as follow:

$$G=2.38*r+2.31*g+0.91*b$$

Figure 4:
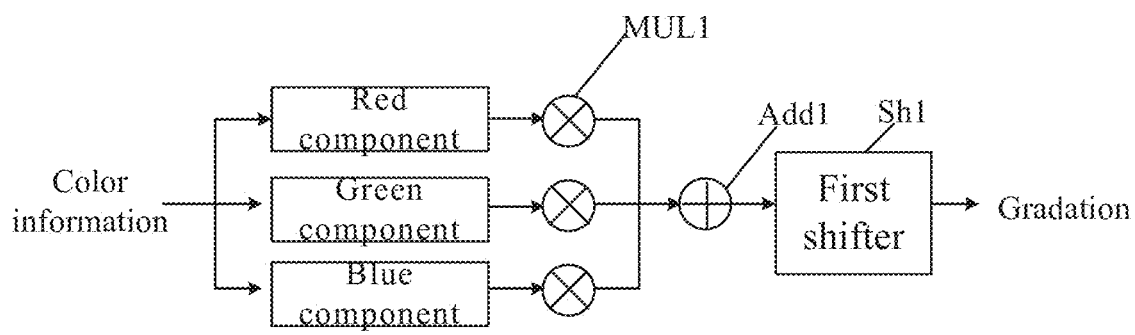
FIG. 4 is a schematic diagram illustrating a gradation conversion principle of a conversion sub-circuit according to an embodiment of the present disclosure.

Herein r, g, and b are the luminance values of the three components of red, green, and blue of the pixel, respectively. Since the image is binarized subsequently, the gradation conversion of the conversion sub-circuit 12a does not need to have a high accuracy. Therefore, weighted coefficients of the three components of red, green and blue need only retain two decimal places to simplify the operation. As shown in FIG. 4, in practical applications, the conversion sub-circuit 12a may include a first multiplier MUL1, a first adder Add1, and a first shifter Sh1. After the color information is input to the conversion sub-circuit 12a, a product of the red component and 38, a product of the green component and 37, and a product of the blue component and 15 are obtained by using the three first multipliers MUL1, respectively, the three products are added by the first adder Add1, and the sum is shifted rightward by four bits (i.e., divided by 16) by the first shifter Sh1, thereby obtaining the converted gradation of the pixel. In addition, the division operation is implemented by the shift method, thereby reducing the complicated calculations and while increasing the calculation speed.

When receiving a gradation value of a pixel in an arbitrary row, for each receipt of gradation of pixel from the mth pixel, the filtering sub-circuit 13a calculates filtered gradation of a pixel which is located before this pixel and has a pixel order with a (m−1)/2 difference from this pixel, and outputs the filtered gradation to the corresponding binarization sub-circuit 14a. The filter kernel used to calculate the filtered gradation value of the pixel is a one-dimensional vector, wherein m is the number of elements of the one-dimensional vector, and m is an odd number greater than one. Herein, the pixel order refers to the number of a pixel in its row. Specifically, in the present disclosure, m is set to 3, and the filter kernel is set to [1, 2, 1]. In other words, when the gradation $G_M$ of the Mth pixel is received, a filtered gradation $G'_{M-1}$ of the M−1th pixel is calculated according to the following formula (1).

$$G'_{M-1}=(G_{M+2}*G_{M-1}+G_{M-2})/4 \qquad (1)$$

Figure 5:
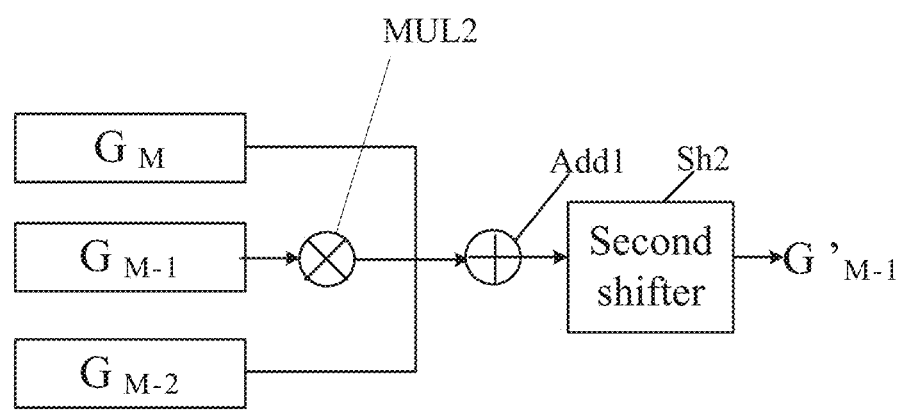
FIG. 5 is a schematic diagram illustrating a filtering principle of a filtering sub-circuit according to an embodiment of the present disclosure.

Herein, $G_{M-1}$ is gradation of the M−1th pixel before filtered, that is, the gradation of M−1 pixels received by the filtering sub-circuit 13a; and $G_{M-2}$ is gradation of the M−2th pixel received by the filtering sub-circuit 13a. Like the conversion sub-circuit 12a, as shown in FIG. 5, the filtering sub-circuit 13a may include a second multiplier MUL2, a second adder Add2, and a second shifter Sh2. The second adder Add2 performs the addition operation in the formula (1), and the second shifter Sh2 performs the division operation in the formula (1), thereby reducing complicated operations. It should be noted that when m is 3, a filtered gradation of the first pixel may be $(G_2+2*G_1+G_1)/4$. That is, a gradation identical to the first pixel is added. In addition, it is also possible to add a gradation identical to the last pixel to calculate a filtered gradation of the last pixel using the gradation, the gradation of the last pixel, and the gradation of the second last pixel.

The noise generated by the detection target positioning device in use mostly comes from electrical noise. Noise reduction can be achieved by Gaussian filtering based on single-line processing (i.e., the target pixel is processed by surrounding pixels in the same row as the target pixel). Compared with the traditional method of performing Gaussian filtering by using a 3*3 or 5*5 filter kernel, the present disclosure uses a one-dimensional vector with a number of elements of 3 as a filter kernel, such that the operation can be simplified; and since the gradation of a pixel can be processed once it is received, only the gradation of two pixels needs to be buffered, thereby avoiding excessive buffer, lowering resource consumption and reducing power consumption.

Of course, m can also be other values, and the filter kernel can also be set as other one-dimensional vectors. When the filtering kernel is another one-dimensional vector, the calculation method of the filtered gradation of each pixel is similar to the above formula (1), and details are not described herein again.

The binarization sub-circuit 14a binarizes gradation of a pixel once it receives the gradation of the pixel, and outputs binarized gradation to the corresponding corrosion sub-circuit 15a. Similar to the cropping sub-circuit 11a and the conversion sub-circuit 12a, the binarization sub-circuit 14a binarizes a pixel once it receives the gradation of the pixel, thereby lowering resource occupation and reducing power consumption.

Figure 6:
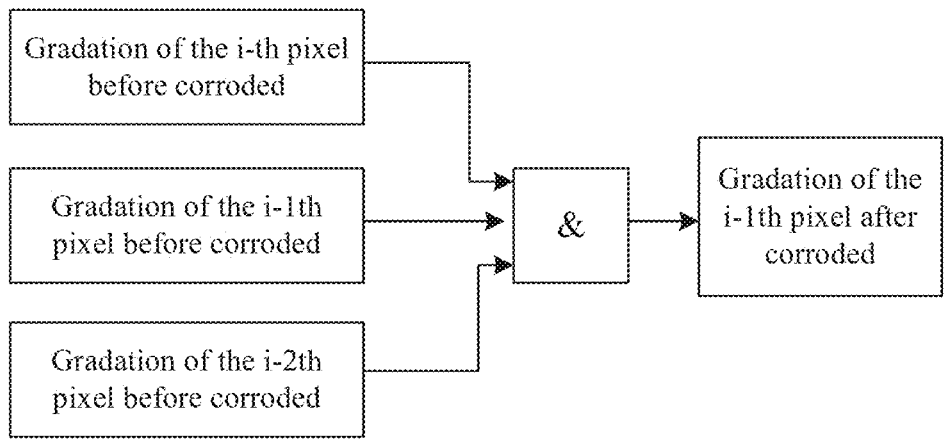
FIG. 6 is a schematic diagram illustrating a corrosion principle of a corrosion sub-circuit according to an embodiment of the present disclosure.

When receiving a gradation value of a pixel in an arbitrary row, for each receipt of gradation of pixel from the n–1th pixel, the corrosion sub-circuit 15a calculates corroded gradation of a pixel which is located before this pixel and has a pixel order with a (n–1)/2 difference from this pixel, and outputs the gradation to the accumulator, wherein n is greater than 1 and less than the number of pixels in the corresponding row, and n is an odd number. In an exemplary embodiment, n is equal to 3. As shown in FIG. 6, when receiving gradation the ith pixel of in arbitrary row, the corrosion sub-circuit 15a performs AND operation on the gradations of the i–2th to ith pixels before corroded, and operation result is taken as a corroded gradation of the i–1th pixel, wherein i is an integer greater than 3 and less than or equal to the number of pixels in the corresponding row. For the first pixel, before the corrosion sub-circuit 15a receives the gradation of the first pixel, a gradation identical to the first pixel can be input to the corrosion sub-circuit 15a to use the gradation, the gradation of the first pixel, and the gradation of the second pixel to calculate the corroded gradation of the first pixel; similarly, after the corrosion sub-circuit 15a receives the last pixel, a gradation identical to the last pixel can be additionally input to the corrosion sub-circuit 15a to use the gradation, the gradation of the last pixel, and the gradation of the second last pixel to calculate the corroded gradation of the last pixel. Similar to the filtering sub-circuit 13a, when n is 3, the corrosion sub-circuit 15a only needs to buffer the gradation of two pixels, thereby lowering the resource occupation and reducing the power consumption.

When a plurality of the cropping sub-circuits 11a, the conversion sub-circuits 12a, the filtering sub-circuits 13a, the binarization sub-circuits 14a, and the corrosion sub-circuits 15a are provided, since the plurality of cropping sub-circuits 11a perform the processing in parallel, the plurality of conversion sub-circuits 12a perform the processing in parallel, the plurality of filtering sub-circuits 13a perform the processing in parallel, the plurality of binarization sub-circuits 14a perform the processing in parallel, and the plurality of corrosion sub-circuits 15a perform the processing in parallel, the pre-processing speed can be further improved.

Figure 7:
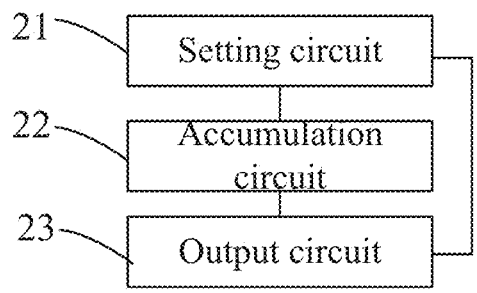
FIG. 7 is a schematic structural diagram illustrating an accumulator according to an embodiment of the present disclosure.

As shown in FIG. 7, the accumulator 12 may specifically include a setting circuit 21, an accumulation circuit 22, and an output circuit 23.

The setting circuit 21 is configured to set a plurality of first data spaces and a plurality of second data spaces. The plurality of first data spaces are in one-to-one correspondence with each row of pixels of the target gradation image, and the plurality of second data spaces are in one-to-one correspondence with each column of pixels of the target gradation image. The first data space and the second data space are both configured to store data, and initial values of data stored in each of the first data spaces and each of the second data spaces are zero.

The accumulation circuit 22 is coupled to the pre-processor 10, and is configured to acquire the gradation of each pixel in the target gradation image obtained by the pre-processor 10; each time the gradation of the pixel is received, to accumulate the gradation of the pixel with data in a first data space corresponding to a row of the pixel to update data in the first data space, and to accumulate the gradation of the pixel with data in a second data space corresponding to the column of the pixel to update the data in the second data space.

The output circuit 23 is coupled to the accumulation circuit 22 and the setting circuit 21, and is configured to, after the accumulation circuit 22 accumulates the gradation of all the pixels in the target gradation image (i.e., each of pixels in the target gradation images is added to the data corresponding to first data space and the data corresponding to the second data space), use a current value of the data in the first data space as the first gradation set corresponding to the row and a current value of the data in the second data space as the second gradation set corresponding to the column; and output the plurality of first gradation sets and the plurality of second gradation sets to the centering component 30.

It can be seen that the accumulator 20 does not need to store the gradation data of all the pixels in the target gradation image when accumulating, but only needs to store two sets of data. The amount of data in one set corresponds to the number of the rows of the pixels in the target gradation image, and the amount of data in the other set corresponds to the number of the columns of the pixels in the target gradation image. Therefore, resource occupation can be reduced.

Figure 8:
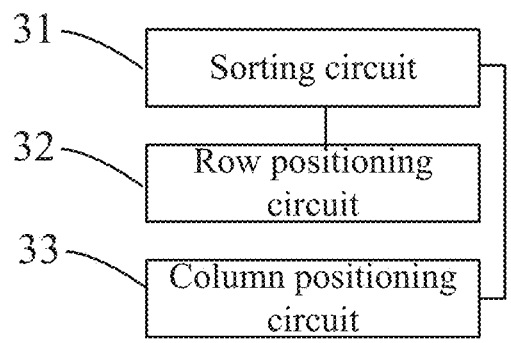
FIG. 8 is a schematic structural diagram of a centering component according to an embodiment of the present disclosure.

As described above, in the process of the binarization, the gradation of the pixel greater than the predetermined threshold is adjusted to be 0. Therefore, in the target gradation image, the gradation of the pixels in the detection target region is greater than the gradation of the pixels in other regions. At this time, as shown in FIG. 8, the centering component 30 includes a sorting circuit 31, a row positioning circuit 32, and a column positioning circuit 33.

The sorting circuit 31 is configured to sort the plurality of first gradation sets according to the serial number of the row corresponding to the first gradation set, and sort the plurality of second gradation sets according to the serial number of the corresponding column of the second gradation set.

Herein, the serial number of the row refers to the row number in the target gradation image in a direction from top to bottom or bottom to top in FIGS. 3a and 3b; the serial number of the column refers to the column number in the target gradation image in a direction from left to right or from right to left in FIGS. 3a and 3b.

The row positioning circuit 32 is coupled to the sorting circuit 31, and is configured to acquire first and last ones of the first gradation sets equal to or greater than a first preset threshold and use rows corresponding to the two first gradation sets as rows of the two ends of the detection target in the column direction, respectively, to determine the row of the center of detection target according to the rows of the two ends. For example, the two ends of the detection target in the column direction are located in the a-th row and the b-th row, respectively, then the center of detection target is located in the (a+b)/2-th row; and when a+b is an odd number, the (a+b±1)/2-th row would be used as the row of the center of detection target.

The column positioning circuit 33 is coupled to the sorting circuit 31, and is configured to acquire first and last ones of the second gradation sets equal to or greater than a second preset threshold and use columns corresponding to the two second gradation sets as columns of the two ends of the detection target in the row direction, respectively, to determine the column of the center of detection target according to the columns of the two ends. For example, the two ends of the detection target in the row direction are located in the a-th column and the b-th column, respectively, then the center of detection target is located in the (a+b)/2-th column; and when a+b is an odd number, the (a+b±1)/2-th column would be used as the column where the center of the detection target is located; or (a+b)/2 would be directly used as the vertical ordinate of the center of detection target.

Figure 9:
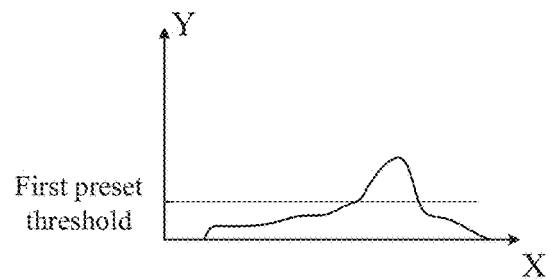
FIG. 9 is a schematic graphical diagram illustrating a row of a center of a detection target determined by a row positioning circuit according to an embodiment of the present disclosure.

The process in which the row positioning circuit 32 determines the row of the center of the detection target may be graphically represented. For the target gradation image shown in FIG. 3b, a curve can be first drawn according to the value of each first gradation set and a row number of its corresponding row. As shown in FIG. 9, an X-axis represents the row number and a Y-axis represents the values of the first gradation set. Then, an intersection of the curve with a straight line the vertical ordinate of which is the first preset threshold is selected, and a midpoint of the horizontal ordinates of the two intersections is the row of the center position (or the horizontal ordinate of the center of the detection target). The process in which the column positioning circuit 33 determines the column of the center of the detection target is similar, and details thereof will not be described herein.

It can be understood that, when the binarization circuit 14 performs the binarization processing, the gradation of the pixel greater than the predetermined threshold may be adjusted to 255. At this time, the row positioning circuit 32 acquires the first and last ones of the first gradation sets less than or equal to the first preset threshold, and uses the rows corresponding to the two first gradation sets as rows of the two ends of the detection target in the column direction, respectively. The column positioning circuit 33 acquires the first and last ones of second gradation sets less than or equal to the second predetermined threshold.

In the present disclosure, the size of the target region, the starting point position, the predetermined threshold, the first preset threshold, the second preset threshold, the filter kernel, and the above value of n may all be configured by using a configuration port provided on the detection target positioning device.

Figure 10:
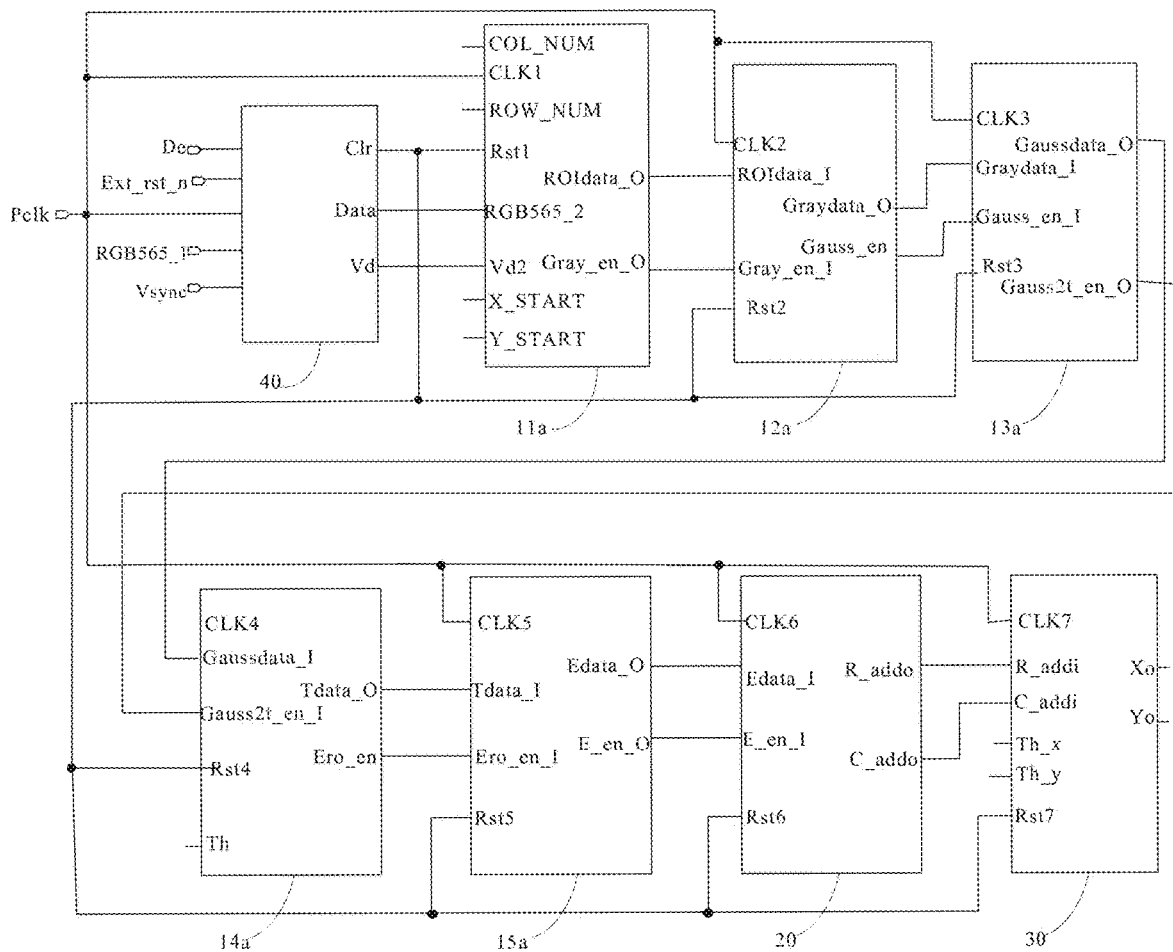
FIG. 10 is a schematic diagram illustrating a circuit configuration of a detection target positioning device according to the embodiment of the present disclosure.

FIG. 10 is a schematic diagram illustrating a circuit configuration of a detection target positioning device.

A receiving component 40 is coupled to an external image capturing device, and configured to receive signals output by the image capturing device and synchronize the clock dominant frequency of the image capturing device with the clock dominant frequency of the detection target positioning device. Input ports of the receiving component include: an external reset terminal Ext_rst_n configured to receive an external reset signal, a pixel clock terminal Pclk configured to receive a pixel clock signal, a data receiving terminal RGB565_1 configured to receive color information of the pixel, a field synchronization signal terminal Vsync, and a pixel clock valid signal terminal De. The input ports are coupled to respective ports of the image capture device. Output ports of the receiving component include: a clear signal terminal Clr, an enable signal output terminal Vd1, and a data output terminal Data. The data output terminal Data outputs color information of the pixel received by the receiving component.

Input ports of the cropping sub-circuit 11a include: a column count terminal COL_NUM, a clock terminal CLK1, a row count terminal ROW_NUM, a data receiving terminal RGB565_2, a reset terminal Rst1, an enable signal input terminal Vd2, a start point horizontal-ordinate input terminal X_START, a starting point vertical-ordinate input Y_START. Herein, the clock terminal CLK1 is coupled to the pixel clock terminal Pclk, the data receiving terminal RGB565_2 is coupled to the data output terminal Data, the reset terminal Rst1 is coupled to the clear signal terminal Clr of the receiving component 40, and the column count terminal COL_NUM and the row count terminal ROW_NUM can be coupled to the configuration port to receive a length and width of the target region configured by the configuration port. Output ports of the cropping sub-circuit 11a include a gradation enable output terminal Gray_en_O and a cropping data output terminal ROIdata_O. The cropping data output terminal ROIdata_O is configured to output the gradation of each pixel in the target region, and the gradation enable output terminal Gray_en_O is configured to output a gradation enable signal when the cropping data output terminal ROIdata_O outputs data.

Input ports of the conversion sub-circuit 12a include a clock terminal CLK2, a gradation enable input terminal Gray_en_I, a cropping data input terminal ROIdata_I, and a reset terminal Rst2. Herein, the clock terminal CLK2 is coupled to the pixel clock terminal Pclk; the gradation enable input terminal Gray_en_I is coupled to the gradation enable output terminal Gray_en_O of the cropping component; the cropping data input terminal ROIdata_O is coupled to the cropping data output terminal ROIdata_I of the cropping sub-circuit; and the reset terminal Rst2 is coupled to the clear signal terminal Clr of the receiving component. The conversion sub-circuit 12a performs gradation conversion on the data received by the cropping data input terminal ROIdata_I when the gradation enable input terminal Gray_en_I receives the gradation enable signal. Output ports of the conversion sub-circuit 12a include a conversion data output terminal Graydata_O and a filter enable output terminal Gauss_en. The conversion data output terminal Graydata_O is configured to output the gradation of pixel that is subjected to the gradation conversion, and the filter enable output terminal Gauss_en_O is configured to output the filter enable signal when the conversion data output terminal Graydata_O outputs the data.

Input ports of the filtering sub-circuit 13a include a clock terminal CLK3, a conversion data input terminal Graydata_I, a filter enable input terminal Gauss_en_I, and a reset terminal Rst3. Herein, the clock terminal CLK3 is coupled to the pixel clock terminal Pclk; the conversion data input terminal Graydata_I is coupled to the conversion data output terminal Graydata_O of the gradation conversion component; the filter enable input terminal Gauss_en_I is coupled to the filter enable output terminal Gauss_en_O of the conversion sub-circuit 12a; and the reset terminal Rst3 is coupled to the clear signal terminal Clr of the receiving component 40. The filtering sub-circuit 13a performs Gaussian filtering on the conversion data received by the conversion data input terminal Graydata_I when the filter enable input terminal Gauss_en_I receives the filter enable signal. Output ports of the filtering sub-circuit 13a include a filter data output terminal Gaussdata_O and a binarization enable output terminal Gauss2t_en_O. The filter data output terminal Gaussdata_O is configured to output Gaussian filtered data, and the binarization enable output terminal Gauss2t_en_O is configured to generate a binarization enable signal when the filter data output terminal Gaussdata_O outputs data.

Input ports of the binarization sub-circuit 14a include a clock terminal CLK4, a filter data input terminal Gaussdata_I, a binarization enable input terminal Gauss2t_en_I, a reset terminal Rst4, and a threshold input terminal Th. Herein, the clock terminal CLK4 is coupled to the pixel clock terminal Pclk; the filter data input terminal Gaussdata_I is coupled to the filter data output terminal Gaussdata_O of the filtering sub-circuit 13a, the reset terminal Rst4 is coupled to the clear signal terminal Clr, and the threshold input terminal Th is coupled to a configuration port. The binarization sub-circuit may perform binarization processing on the data received by the filter data input terminal Gaussdata_I when the binarization enable input terminal Gauss2t_en_I receives the binarization enable signal. Output ports of the binarization sub-circuit 14a include a binarization data output terminal Tdata_O and a corrosion enable output terminal Ero_en. The binarization data output terminal Tdata_O is configured to output binarized data, and the corrosion enable output terminal Ero_en_O is configured to output a corrosion enable signal when the binarization data output terminal Tdata_O outputs data.

Input ports of the corrosion sub-circuit 15a include a clock terminal CLK5, a reset terminal Rst5, a binarization data input terminal Tdata_I, and a corrosion enable input terminal Ero_en_I. Herein, the clock terminal CLK5 is coupled to the pixel clock terminal Pclk; the reset terminal Rst5 is coupled to the clear signal terminal Clr; the binarization data input terminal Tdata_I is coupled to the binarization data output terminal Tdata_O; the corrosion enable input terminal Ero_en_I is coupled to the corrosion enable output terminal Ero_en_O. The corrosion sub-circuit 15a corrodes the data received by the binarization data input terminal Tdata_I when the corrosion enable input terminal Ero_en_I receives the corrosion enable signal. Output ports of the corrosion sub-circuit 15a include a corrosion data output terminal Edata_O and an accumulation enable output terminal E_en_O. The corrosion data output terminal Edata_O is configured to output corroded data, and the accumulation enable output terminal S_en_O is configured to output an accumulation enable signal when the corrosion data output terminal Edata_O outputs data.

Input ports of the accumulator 20 include: a clock terminal CLK6, a reset terminal Rst6, a corrosion data input terminal Edata_I, and an accumulation enable input terminal E_en_I. Herein the clock terminal CLK6 is coupled to the pixel clock terminal Pclk; the reset terminal Rst6 is coupled to the clear signal terminal Clr of the receiving component; and the accumulation enable terminal E_en_I is coupled to the accumulation enable output terminal E_en_O. Output ports of the accumulator 20 include a row accumulation output terminal R_addo and a column accumulation output terminal C_addo. The accumulator 20 accumulates received data when the accumulation enable input terminal E_en_I receives an accumulation enable signal, and outputs the data in each of the first data spaces described above from the row accumulation output terminal R_addo and the data in each of the second data spaces is output from the column accumulation output terminal C_addo.

Input ports of the centering component 30 include: a clock terminal CLK7, a reset terminal Rst7, a row accumulation input terminal R_addi, and a column accumulation input terminal C_addi, a first threshold input terminal Th_x, and a second threshold input terminal Th_y. Output ports of the centering component 30 include: a row number output terminal Xo and a column number output terminal Yo. Herein, the clock terminal CLK7 is coupled to the pixel clock terminal Pclk; the reset terminal Rst7 is coupled to the clear signal terminal Clr; the row accumulation input terminal R_addi is coupled to the row accumulation output terminal R_addo; and the column accumulation input terminal C_addo is coupled to the column accumulation output terminal C_addo. The centering component calculates the row number of the row of the center of detection target and the column number of the column i where the center of detection target is located according to input data of the input ports, and outputs the row number and the column number from the row number output terminal Xo and the column number output terminal Yo, respectively.

In addition, the detection target positioning device may further include a reporting component (not shown), and the reporting component may include reporting interfaces, such as an SPI (Serial Peripheral Interface), an I2C (Inter-Integrated Circuit), a UART (Universal Asynchronous Receiver/Transmitter), configured to report a calculation result of the centering component to an upper computer. In addition, the reporting component may further include a plurality of configuration ports, which are able to configure corresponding data for the starting point horizontal-ordinate input terminal X_START of the cropping sub-circuit, the starting point vertical-ordinate input terminal Y_START of the cropping sub-circuit, the column count terminal COL_NUM, and the row count terminal ROW_NUM, the threshold input terminal Th of the binarization sub-circuit, the first threshold input terminal Th_x of the centering component and the second threshold input terminal Th_y, respectively.

When the detection target positioning device in the present disclosure is verified by using the EP4CE22F17C8N as a carrier, power dissipations of the detection target positioning device are as shown in Table 1. The accuracy results of different detection target positioning methods are shown in Table 2. The resource occupancies of the image preprocessing using different methods are shown in Table 3.

TABLE 1

| Item | Power Dissipation |
| --- | --- |
| Total Thermal Power Dissipation | 111.38 mW |
| Core Dynamic Thermal Power Dissipation | 6.07 mW |
| Core Static Thermal Power Dissipation | 77.50 mW |
| I/O Thermal Power Dissipation | 22.82 mW |

TABLE 2

| Item | Traditional pre-processing + Accumulative positioning | Traditional pre-processing + ellipse fitting positioning | The disclosure |
|---|---|---|---|
| Accuracy (≤2°) | 96.7% | 97.6% | 94.7% |
| Accuracy (≤1°) | 87% | 89.9% | 81.2% |

TABLE 3

| Item | Traditional pre-processing + Accumulative positioning | The disclosure |
|---|---|---|
| Gaussian filter | 426 LEs | 45 LEs |
| Corrosion | 147 LEs | 7 LEs |
| Buffer | 10240 bits | 2632 bits |
| Total occupation of resource | 1.4k + LEs | 463 LEs |

As can be seen from Table 2 and Table 3, the detection target positioning process of "traditional preprocessing+accumulative method positioning", "traditional preprocessing+ellipse fitting positioning", or "this disclosure" includes preprocessing (i.e., image cropping, gradation conversion, Gaussian filtering, binarization, and corrosion which are performed in sequence) and positioning are performed. Herein, "traditional preprocessing+accumulative positioning" means that when the image is subjected to gradation processing, three weighting coefficients retain 8 decimal places; when Gaussian filtering is performed on the image, a 3*3 filtering kernel is employed; when the image is corroded, a 3*3 AND operation is employed; and the method of determining the center of detection target is the same as the method of determining the center of detection target using the accumulator and the centering component in the present disclosure. The "traditional preprocessing+ellipse fitting" has the same preprocessing process as the "traditional preprocessing+accumulative positioning", except that the method of determining the center of detection target is ellipse fitting. In the method of "the disclosure", when performing gradation processing, each of the three weighting coefficients retains 2 decimal places; when performing Gaussian filtering, filter kernels of [1, 2, 1] are employed, and 1*3 AND operation is used for corrosion; and when centering, the center of detection target is determined by using the above-mentioned accumulator and the centering component.

As can be seen from Table 1 to Table 3, the detection target positioning device according to the present disclosure consumes less power and significantly reduces resource occupancy when performing detection target positioning. Although the accuracy is slightly lower than the ellipse fitting, it is sufficient to meet the demand.

Figure 11:
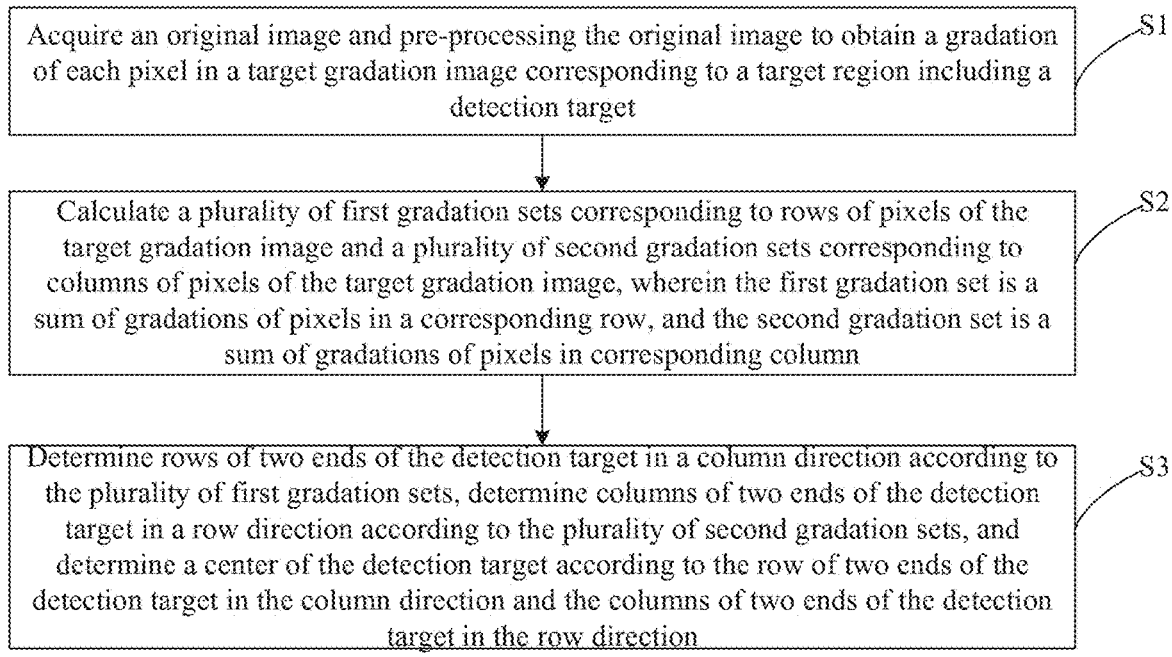
FIG. 11 is a flowchart of a detection target positioning method according to an embodiment of the present disclosure.

As another aspect of the present disclosure, a detection target positioning method is provided. As shown in FIG. 11, the detection target positioning method includes:

S1, acquiring an original image and pre-processing the original image to obtain a gradation of each pixel in a target gradation image corresponding to a target region including a detection target;

S2, calculating a plurality of first gradation sets corresponding to rows of pixels of the target gradation image and a plurality of second gradation sets corresponding to columns of pixels of the target gradation image, wherein the first gradation set is a sum of gradations of pixels in a corresponding row, and the second gradation set is a sum of gradations of pixels in corresponding column; and S3, determining rows of two ends of the detection target in a column direction according to the plurality of first gradation sets, determining columns of two ends of the detection target in a row direction according to the plurality of second gradation sets, and determining a center of the detection target according to the row of two ends of the detection target in the column direction and the columns of two ends of the detection target in the row direction.

Compared with a complicated calculation method such as the ellipse fitting employed in the related art, when the center of the detection target is located by the detection target positioning method according to the present disclosure, only a simple addition operation is required. Therefore, the detection target positioning method according to the present disclosure is simpler and provides a higher positioning efficiency.

The detection target positioning method will be specifically described below by using color image as the original image for example. In an exemplary embodiment, the detection target positioning method includes:

S1, acquiring the original image and pre-processing the original image to obtain the gradation of each pixel in the target gradation image corresponding to the target region including the detection target.

Figure 12:
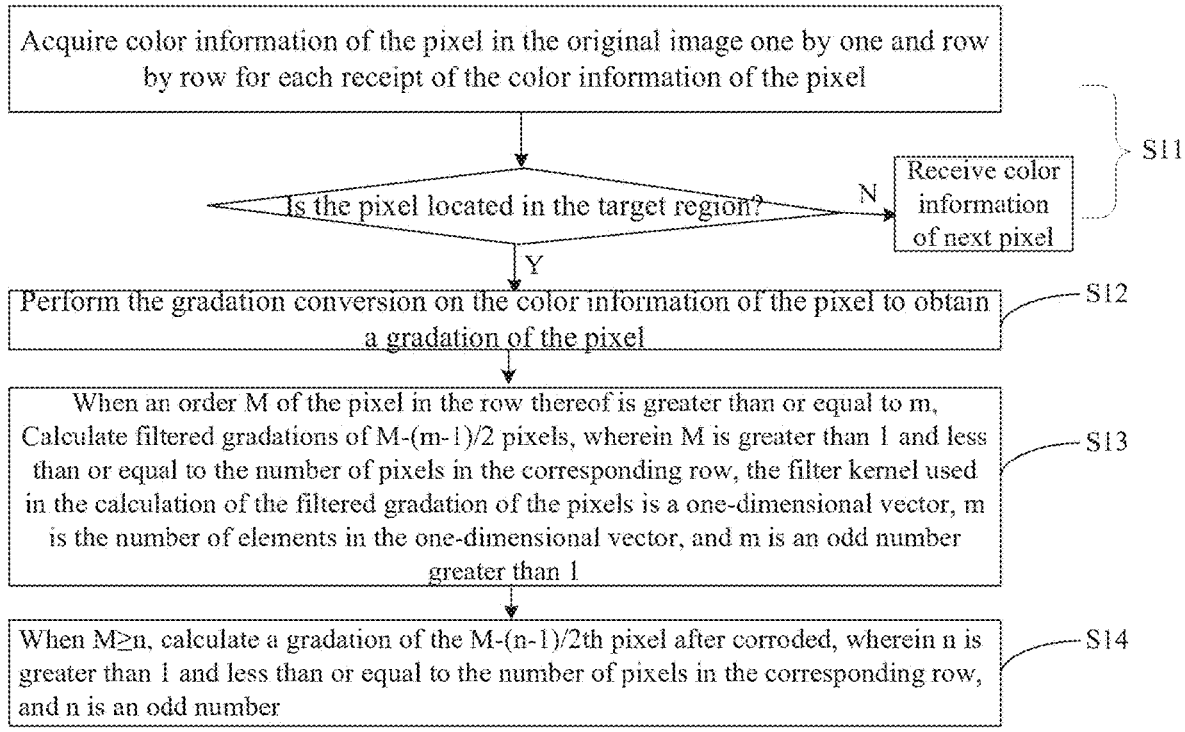
FIG. 12 is a flowchart illustrating the specific step S1 in the detection target positioning method.

Herein the pre-processing includes image cropping, gradation conversion, Gaussian filtering, binarization processing, and corrosion processing, which are performed in sequence. The principles and processing results of each process have been described above, and description thereof will be omitted herein. As shown in FIG. 12, the Step S1 specifically includes:

S11, acquiring color information of the pixel in the original image one by one and row by row, and judging whether the pixel is located in the target region for each receipt of the color information of the pixel, and if so, sequentially performing subsequent steps;

S12, performing the gradation conversion on the color information of the pixel to obtain a gradation of the pixel;

S13, when an order M of the pixel in the row thereof is greater than or equal to m, calculating filtered gradations of M−(m−1)/2 pixels, wherein M is greater than 1 and less than or equal to the number of pixels in the corresponding row, the filter kernel used in the calculation of the filtered gradation of the pixels is a one-dimensional vector, m is the number of elements in the one-dimensional vector, and m is an odd number greater than 1; specifically, the filter kernel is [1, 2, 1], that is, when the gradation of the Mth pixel in any row is acquired, a gradation of the M−1th pixel before filtered and a gradation of the M−2th pixel before filtered is used to calculate a gradation of the Mth pixel before filtered; and for the calculation process, the reference can be made to the description of the filtering sub-circuit above, which will not be described here;

S14, when M≥n, calculating a gradation of the M−(n−1)/2th pixel after corroded, wherein n is greater than 1 and less than or equal to the number of pixels in the corresponding row, and n is an odd number; and specifically, n is 3. The step S14 specifically includes: when M≥n, performing an AND operation on the gradation values of the M−2th to the Mth pixels before corroded, and using the operation result as a gradation of the M−1th pixel after corroded.

After the Step S1, the detection target positioning method further includes:

S2, calculating a plurality of first gradation sets corresponding to rows of pixels of the target gradation image and a plurality of second gradation sets corresponding to columns of pixels of the target gradation image, wherein the first gradation set is a sum of gradations of pixels in a corresponding row, and the second gradation set is a sum of gradations of pixels in corresponding column.

Figure 13:
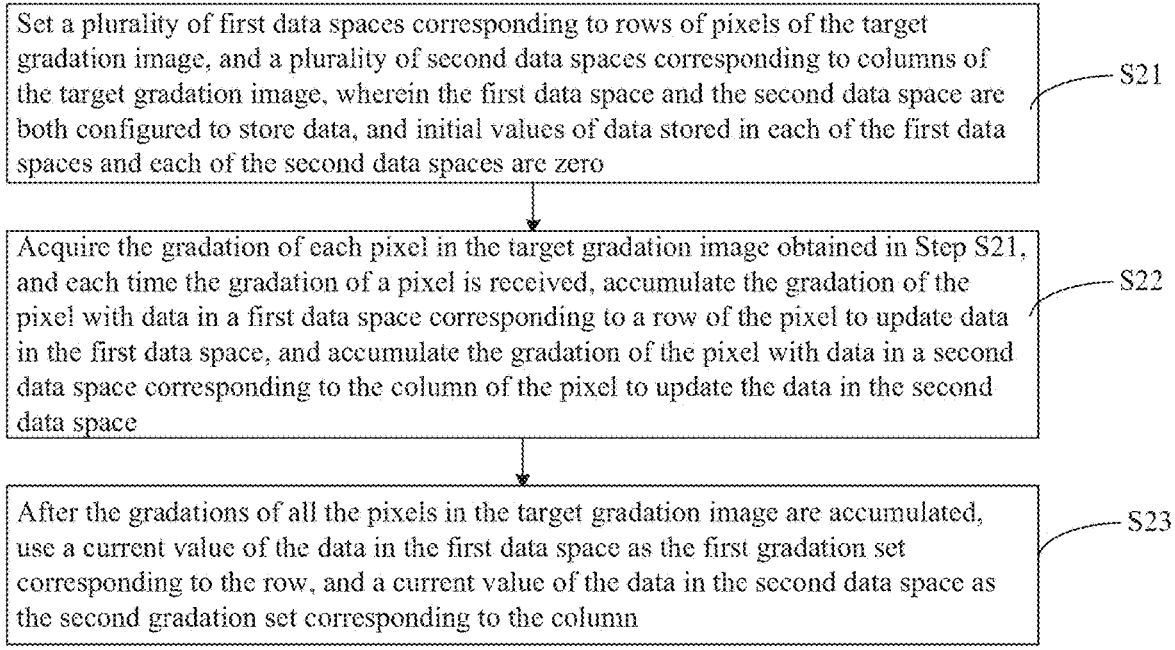
FIG. 13 is a flowchart illustrating the specific step S2 in the detection target positioning method.

Specifically, as shown in FIG. 13, the Step S2 includes:

S21, setting a plurality of first data spaces corresponding to rows of pixels of the target gradation image, and a plurality of second data spaces corresponding to columns of the target gradation image, wherein the first data space and the second data space are both configured to store data, and initial values of data stored in each of the first data spaces and each of the second data spaces are zero;

S22, acquiring the gradation of each pixel in the target gradation image obtained in Step S21, and each time the gradation of a pixel is received, accumulating the gradation of the pixel with data in a first data space corresponding to a row of the pixel to update data in the first data space, and accumulating the gradation of the pixel with data in a second data space corresponding to the column of the pixel to update the data in the second data space;

S23, after the gradations of all the pixels in the target gradation image are accumulated, using a current value of the data in the first data space as the first gradation set corresponding to the row, and a current value of the data in the second data space as the second gradation set corresponding to the column.

Figure 14:
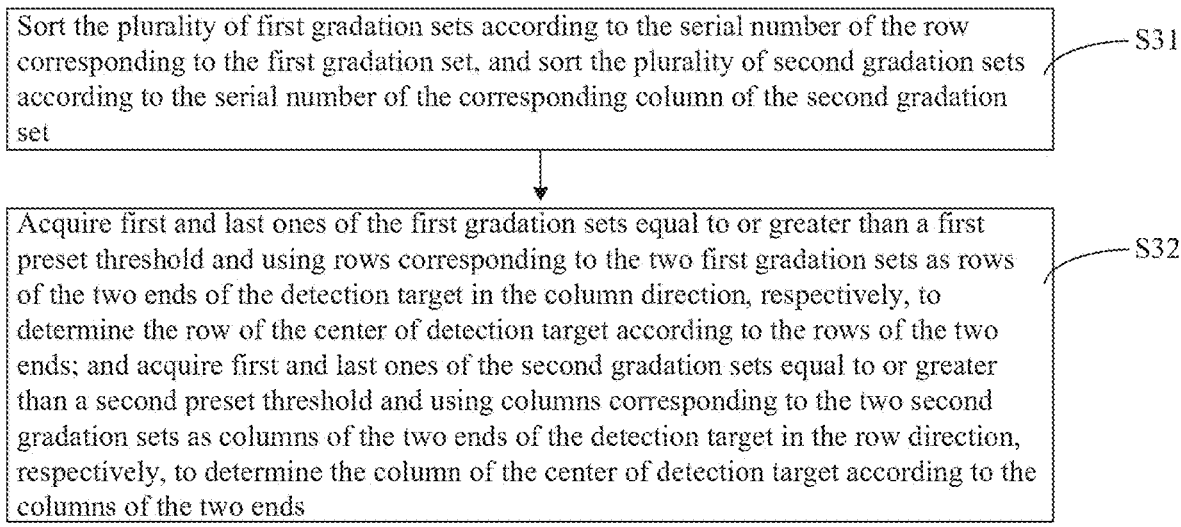
FIG. 14 is a flowchart illustrating the specific step S3 in the detection target positioning method.

After the Step S2, the method further includes: S3, acquiring rows of two ends of the detection target in a column direction according to a plurality of first gradation sets, acquiring columns of both ends of the detection target in a row direction according to a plurality of second gradation sets, and determining a center of the detection target according to the rows of two ends of the detection target in the column direction and the columns of both ends of the detection target in the row direction. Specifically, as shown in FIG. 14, the Step S3 includes the following Steps S31 to S32:

S31, sorting the plurality of first gradation sets according to the serial number of the row corresponding to the first gradation set, and sorting the plurality of second gradation sets according to the serial number of the corresponding column of the second gradation set;

S32, acquiring first and last ones of the first gradation sets equal to or greater than a first preset threshold and using rows corresponding to the two first gradation sets as rows of the two ends of the detection target in the column direction, respectively, to determine the row of the center of detection target according to the rows of the two ends; and acquiring first and last ones of the second gradation sets equal to or greater than a second preset threshold and using columns corresponding to the two second gradation sets as columns of the two ends of the detection target in the row direction, respectively, to determine the column of the center of detection target according to the columns of the two ends.

In the detection target positioning method according to the present disclosure, in the preprocessing of an image, each preprocessing process (image cropping, gradation conversion, Gaussian filtering, etc.) includes: after a gradation of a pixel is acquired, preprocessing the pixel or a pixel before the pixel without waiting to acquire gradations of all pixels. In this manner, processing speed can be increased and the resource usage can be reduced. In the calculation of the first gradation set and the second gradation set, the first data space and the second data space are established, and each time a gradation of a pixel is acquired, the gradation is accumulated with the data in the corresponding first data space and the data in the corresponding second data space. When the gradations of all the pixels are acquired, the accumulation process ends. In this way, it is not necessary to buffer the gradations of all pixels, but only two sets of data are buffered, thereby further reducing resource occupation.

As a further aspect of the present disclosure, there is provided a sight tracking device, including the above-described detection target positioning device according to the present disclosure. The sight tracking device may further include an image acquisition device (e.g., a camera) configured to acquire an original image, the detection target positioning device is coupled to the image acquisition device to acquire the original image.

Since the detection target positioning device performs the detection target positioning with the relatively fast positioning speed, the sight tracking device has a faster sight tracking speed and can satisfy the real-time report point of the high frame rate image acquisition device, thereby improving user experience. Moreover, the detection target positioning device can use the FPGA or ASIC as a carrier, thereby escaping the dependence on the CPU and improving the portability of the detection target positioning device. Therefore, the sight tracking device using the detection target positioning device is more portable, and thus can be applied to a wider range of applications.

It is to be understood that the above embodiments are merely exemplary embodiments for the purpose of explaining the principles of the present disclosure, but the present disclosure is not limited thereto. Various modifications and improvements can be made by those skilled in the art without departing from the spirit and scope of the disclosure, and such modifications and improvements are also considered to be within the scope of the disclosure.

The invention claimed is:

1. A detection target positioning method, comprising steps of:
    acquiring an original image and pre-processing the original image to obtain a gradation of each pixel in a target gradation image corresponding to a target region including a detection target, wherein the pre-processing includes Gaussian filtering, the Gaussian filtering including: when receiving a gradation value of a pixel in an arbitrary row, for each receipt of the gradation of a pixel from an mth pixel, calculating a filtered gradation of a pixel which is located before the mth pixel and has a pixel order with a (m−1)/2 difference from the mth pixel, and outputting the filtered gradation, wherein a filter kernel used to calculate the filtered gradation of the pixel is a one-dimensional vector, m is a number of elements of the one-dimensional vector, and m is an odd number greater than 1;
    calculating a plurality of first gradation sets corresponding to rows of pixels of the target gradation image and a plurality of second gradation sets corresponding to columns of pixels of the target gradation image, wherein the first gradation set is a sum of gradations of pixels in a corresponding row, and the second gradation set is a sum of gradations of pixels in a corresponding column; and determining rows of two ends of the detection target in a column direction according to the plurality of first gradation sets, determining columns of two ends of the detection target in a row direction according to the plurality of second gradation sets, and determining a central point of the detection target according to the rows of two ends of the detection target in the column direction and the columns of two ends of the detection target in the row direction.

2. The detection target positioning method according to claim 1, wherein the step of calculating a plurality of first gradation sets corresponding to rows of pixels of the target gradation image and a plurality of second gradation sets corresponding to columns of pixels of the target gradation image wherein the first gradation set is a sum of gradations of pixels in a corresponding row and the second gradation set is a sum of gradations of pixels in corresponding column, comprises:

setting a plurality of first data spaces corresponding to rows of pixels of the target gradation image, and a plurality of second data spaces corresponding to columns of the target gradation image, wherein the first data space and the second data space are both configured to store data, and initial values of data stored in each of the first data spaces and each of the second data spaces are zero;

acquiring the gradation of each pixel in the target gradation image, and each time the gradation of a pixel is received, accumulating the gradation of the pixel with data in the first data space corresponding to a row of the pixel to update data in the first data space, and accumulating the gradation of the pixel with data in the second data space corresponding to the column of the pixel to update the data in the second data space; and after the gradations of all the pixels in the target gradation image are accumulated, using a current value of the data in the first data space as the first gradation set corresponding to the row, and a current value of the data in the second data space as the second gradation set corresponding to the column.

3. The detection target positioning method according to claim 1, wherein the step of determining rows of two ends of the detection target in a column direction according to the plurality of first gradation sets, determining columns of two ends of the detection target in a row direction according to the plurality of second gradation sets, and determining the central point of the detection target according to the row of two ends of the detection target in the column direction and the columns of two ends of the detection target in the row direction, comprises:

sorting the plurality of first gradation sets according to a serial number of the row corresponding to the first gradation set, and sorting the plurality of second gradation sets according to a serial number of the corresponding column of the second gradation set;

acquiring first and last ones of the first gradation sets equal to or greater than a first preset threshold and using rows corresponding to the first and the last ones of the first gradation sets as rows of the two ends of the detection target in the column direction, respectively, to determine the row of the central point of detection target according to the rows of the two ends; and acquiring first and last ones of the second gradation sets equal to or greater than a second preset threshold and using columns corresponding to the first and the last ones of the second gradation sets as columns of the two ends of the detection target in the row direction, respectively, to determine the column of the central point of detection target according to the columns of the two ends.

4. The detection target positioning method according to claim 1, wherein the original image is a color image; and the pre-processing comprises image cropping, gradation conversion, Gaussian filtering, binarization processing, and corrosion processing, which are performed in sequence.

5. The detection target positioning method according to claim 4, wherein the step of acquiring an original image and pre-processing the original image to obtain a gradation of each pixel in a target gradation image corresponding to a target region including a detection target, comprises:

acquiring color information of the pixel in the original image one by one and row by row, and judging whether the pixel is located in the target region for each receipt of the color information of the pixel, wherein if so, sequentially performing subsequent steps:

performing the gradation conversion on the color information of the pixel to obtain the gradation of the pixel;

when an order M of the pixel in the row is greater than or equal to m, calculating filtered gradations of $M-(m-1)/2$ pixels, wherein M is greater than 1 and less than or equal to the number of pixels in the corresponding row; and when M≥n, calculating a gradation of the $M-(n-1)/2$th pixel after corroded, wherein n is greater than 1 and less than or equal to the number of pixels in the corresponding row, and n is an odd number.

6. The detection target positioning method according to claim 5, wherein the filter kernel in the step of calculating filtered gradations of $M-(m-1)/2$ pixels is [1,2,1].

7. The detection target positioning method according to claim 5, wherein n is 3, and the step of calculating a gradation of the $M-(n-1)/2$th pixel after corroded, comprises: when M≥3, performing an AND operation on the gradation values of the M−2th to the Mth pixels before corroded, and using the operation result as a gradation of the M−1th pixel after corroded.

8. The detection target positioning method according to claim 1, wherein the detection target is a pupil.

9. A detection target positioning device, comprising:

a pre-processor, configured to acquire an original image and pre-process the original image to obtain a gradation of each pixel in a target gradation image corresponding to a target region including a detection target;

an accumulator, configured to calculate a plurality of first gradation sets corresponding to rows of pixels of the target gradation image and a plurality of second gradation sets corresponding to columns of pixels of the target gradation image, wherein the first gradation set is a sum of gradations of pixels in a corresponding row, and the second gradation set is a sum of gradations of pixels in a corresponding column; and a centering component, configured to determine rows of two ends of the detection target in a column direction according to the plurality of first gradation sets, determine columns of two ends of the detection target in a row direction according to the plurality of second gradation sets, and determine a central point of the detection target according to the rows of two ends of the detection target in the column direction and the columns of two ends of the detection target in the row direction, wherein the pre-processor comprises a Gaussian filter circuit, the Gaussian filter circuit being configured to perform Gaussian filtering on a first gradation image to obtain a gradation of each pixel of a second gradation image and including a filtering sub-circuit, wherein when receiving a gradation value of a pixel in an arbitrary row, for each receipt of the gradation of a pixel from an mth pixel, the filtering sub-circuit calculates a filtered gradation of a pixel which is located before the mth pixel and has a pixel order with a (m−1)/2 difference from the mth pixel and outputs the filtered gradation, wherein a filter kernel used to calculate the filtered gradation of the pixel is a one-dimensional vector, m is a number of elements of the one-dimensional vector, and m is an odd number greater than 1.

10. The detection target positioning device according to claim 9, wherein the accumulator comprises:
a setting circuit, configured to set a plurality of first data spaces and a plurality of second data spaces, wherein the plurality of first data spaces are in one-to-one correspondence with each row of pixels of the target gradation image, the plurality of second data spaces are in one-to-one correspondence with each column of pixels of the target gradation image, the first data space and the second data space are configured to store data, and initial values of data stored in each of the first data spaces and each of the second data spaces are zero;
an accumulation circuit, configured to acquire the gradation of each pixel in the target gradation image obtained by the pre-processor; each time the gradation of the pixel is received, to accumulate the gradation of the pixel with data in the first data space corresponding to a row of the pixel to update data in the first data space, and to accumulate the gradation of the pixel with data in the second data space corresponding to the column of the pixel to update the data in the second data space; and
an output circuit, configured to, after the accumulation circuit accumulates the gradation of all the pixels in the target gradation image, use a current value of the data in the first data space as the first gradation set corresponding to the row and a current value of the data in the second data space as the second gradation set corresponding to the column, and output the plurality of first gradation sets and the plurality of second gradation sets to the centering component.

11. The detection target positioning device according to claim 9, wherein in the target gradation image, the gradation of the pixels in the detection target region is greater than the gradation of the pixels in other regions, and the centering component comprises:
a sorting circuit, configured to sort the plurality of first gradation sets according to a serial number of the row corresponding to the first gradation set, and sort the plurality of second gradation sets according to a serial number of the corresponding column of the second gradation set;
a row positioning circuit, configured to acquire first and last ones of the first gradation sets equal to or greater than a first preset threshold and use rows corresponding to the first and the last ones of the first gradation sets as rows of the two ends of the detection target in the column direction, respectively, to determine the row of the central point of detection target according to the rows of the two ends; and
a column positioning circuit, configured to acquire first and last ones of the second gradation sets equal to or greater than a second preset threshold and use columns corresponding to the first and the last ones of the second gradation sets as columns of the two ends of the detection target in the row direction, respectively, to determine the column of the central point of detection target according to the columns of the two ends.

12. The detection target positioning device according to claim 9, wherein the original image is a color image and the pre-processor further comprises:
an image cropping circuit, configured to perform image cropping on the original image to obtain color information of each pixel in the color image of the target region;
a gradation conversion circuit, configured to perform gradation conversion on the color image of the target region to obtain the gradation of each pixel of a first gradation image;
a binarization circuit, configured to perform binarization processing on the second gradation image to obtain gradation of each pixel in a third gradation image; and
a corrosion circuit, configured to corrode the third gradation image to obtain the gradation of each pixel of the target gradation image.

13. The detection target positioning device according to claim 12, wherein
the image cropping circuit includes one or more in-parallel cropping sub-circuits, the gradation conversion circuit includes one or more conversion sub-circuits corresponding to the one or more in-parallel cropping sub-circuits, respectively, the Gaussian filter circuit includes one or more filtering sub-circuits corresponding to the one or more conversion sub-circuits, respectively, the binarization circuit includes one or more binarization sub-circuits corresponding to the one or more filtering sub-circuits, respectively, and the corrosion circuit includes one or more corrosion sub-circuits corresponding to the one or more binarization sub-circuits, respectively;
the cropping sub-circuit is configured to receive the color information of the pixel in the original image row by row and one by one, and judge whether the pixel is located in the target region for each receipt of the color information of the pixel, wherein if yes, the color information of the pixel is output to the corresponding conversion sub-circuit;
each time the conversion sub-circuit receives the color information of one pixel, the conversion sub-circuit performs the gradation conversion on the color information and outputs the converted gradation to the corresponding filtering sub-circuit;
outputs the filtered gradation to the corresponding binarization sub-circuit;
the binarization sub-circuit binarizes gradation of a pixel each time the binarization sub-circuit receives the gradation of the pixel, and outputs binarized gradation to the corresponding corrosion sub-circuit; and
when receiving a gradation value of a pixel in an arbitrary row, for each receipt of gradation of pixel from an n−1th pixel, the corrosion sub-circuit calculates corroded gradation of a pixel which is located before the n−1th pixel and has a pixel order with a (n−1)/2 difference from the n−1th pixel, and outputs the gradation to the accumulator, wherein n is greater than 1 and less than the number of pixels in the corresponding row, and n is an odd number.

14. The detection target positioning device according to claim 13, wherein the filter kernel is [1,2,1].

15. The detection target positioning device according to claim 13, wherein n is 3, and when receiving gradation an ith pixel of in arbitrary row, the corrosion sub-circuit performs AND operation on the gradations of the i−2th to ith pixels before corroded, and operation result is taken as a corroded gradation of the i−1th pixel, wherein i is an integer greater than 3 and less than or equal to the number of pixels in the corresponding row.

16. The detection target positioning device according to claim 9, wherein the detection target positioning device uses a Field-Programmable Gate Array FPGA or an Application Specific Integrated Circuit ASIC as a carrier.

17. The detection target positioning device according to claim 9, wherein the detection target is a pupil.

18. A sight tracking device, comprising the detection target positioning device according to claim 9.

19. A non-transitory computer readable storage medium in which computer executable instructions for executing the method according to claim 1 are stored.

* * * * *